United States Patent [19]

Hertz

[11] Patent Number: 5,328,524
[45] Date of Patent: Jul. 12, 1994

[54] PROCESS FOR THE SURFACE OXIDATION OF A PART COMPOSED OF PASSIVATABLE METAL, AND FUEL ASSEMBLY ELEMENTS COMPOSED OF METAL ALLOY COVERED WITH A PROTECTIVE OXIDE LAYER

[75] Inventor: Dominique Hertz, Tassin-la-Demi-Lune, France

[73] Assignees: Framatome, Courbevoie, France; Cogema, Velizy Villacoublay, France

[21] Appl. No.: 592,327

[22] Filed: Oct. 3, 1990

[30] Foreign Application Priority Data

Oct. 3, 1989 [FR] France ............... 89 12920

[51] Int. Cl.⁵ ............................... C23C 8/36
[52] U.S. Cl. ............................ 148/241; 148/281
[58] Field of Search ............... 148/241, 81; 204/164

[56] References Cited

U.S. PATENT DOCUMENTS

| | | | |
|---|---|---|---|
| 3,615,885 | 10/1971 | Watson | 148/281 |
| 3,658,672 | 4/1972 | Norris | |
| 4,232,057 | 11/1980 | Ray | 427/39 |
| 4,585,541 | 4/1986 | Miyake et al. | 204/164 |
| 4,589,929 | 5/1986 | Steinberg | 148/269 |
| 5,062,900 | 11/1991 | Berneron | 204/164 |

FOREIGN PATENT DOCUMENTS

| | | | |
|---|---|---|---|
| 555952 | 4/1958 | Canada | 148/281 |
| 0016909 | of 0000 | European Pat. Off. | |
| 0116888 | of 0000 | European Pat. Off. | |
| 0305241 | of 0000 | European Pat. Off. | |
| 54863 | of 0000 | Fed. Rep. of Germany | |
| 1621420 | 5/1971 | Fed. Rep. of Germany | 427/6 |
| 427453 | of 0000 | Switzerland | |
| 860563 | of 0000 | United Kingdom | |

OTHER PUBLICATIONS

Chemical Abstracts–vol. 101, 1984, p. 280.
"Oxidation coloring method of titanium by low temperature plasma".
"Method and device for surface processing by glow electric discharge".

Primary Examiner—Sam Silverberg
Attorney, Agent, or Firm—Pollock, Vande Sande & Priddy

[57] ABSTRACT

Oxidation treatments by ionic bombardment or post-discharge result in the formation on the surface of passivatable metals and alloys of a layer of oxide having a thickness of a few micrometers which protects the substrates from subsequent corrosion. The gas activated by the electric discharge is put in contact with the surface of the part (2) to be oxidized, which is brought to a temperature of 350° to 650° C. The treatment may be employed in particular for forming a protective covering on an element or a complete framework composed of a zirconium alloy of a fuel assembly of a water-cooled nuclear reactor.

6 Claims, 2 Drawing Sheets

PROCESS FOR THE SURFACE OXIDATION OF A PART COMPOSED OF PASSIVATABLE METAL, AND FUEL ASSEMBLY ELEMENTS COMPOSED OF METAL ALLOY COVERED WITH A PROTECTIVE OXIDE LAYER

FIELD OF THE INVENTION

The invention relates to a process for the surface oxidation, activated by a plasma, of at least one zone of a part composed of a passivatable metal or alloy such as zirconium, hafnium or alloys thereof.

BACKGROUND OF THE INVENTION

The fuel assemblies of nuclear reactors cooled by water under pressure or boiling water are formed by combustible elements termed rods, maintained in a rigid framework so as to constitute a cluster in which the rods are disposed in parallel relation to one another.

The fuel rods are formed by sheathing tubes, generally of zirconium alloy, for example Zircaloy 4, enclosing pellets of uranium oxide or sintered plutonium stacked one on top of the other in the axial direction of the tube. The tube is sealed by plugs of zirconium alloy and the sintered fuel pellets are placed inside the tube in an inert gas atmosphere under pressure.

The framework of the assembly is generally constituted by transverse spacer grids for maintaining the rods in a regular network and by longitudinal guide tubes rigidly fixed to the spacer grids in the region of certain cells reserved for the passage of the guide tubes.

The fuel assembly is generally closed at its ends by end members fixed to the ends of the guide tubes.

Most of the elements of the framework of the fuel assemblies of water-cooled reactors are made from zirconium alloy.

The elements for regulating and stopping the nuclear reactor comprise, as the case may be, sheathed or unsheathed bars of alloyed or non-alloyed hafnium sliding in the guide tubes of the assembly.

In the nuclear reactor in operation, the fuel assemblies are subjected to various types of corrosive attack on their surface in contact with the cooling water of the reactor or on their surface in contact with the fuel.

The sheathing tubes of the fuel elements through which there is a large thermal flow and which are in contact with the cooling water only on their outer surface are principally subjected to oxidation and to the various forms of attack due to interaction between the fuel pellets, which undergo a swelling under irradiation, and the inner surface of the tube.

The elements constituting the framework, and in particular the guide tubes which are in contact with the cooling water on both sides and through which there is no large thermal flow, undergo principally a hydridation under the action of the hydrogen which is formed upon contact at high temperature between the cooling water and the zirconium constituting the principal element of the components of the assembly, in accordance with the reaction:

$$Zr + 2H_2O \rightarrow ZrO_2 + 2H_2.$$

A part of the hydrogen formed by this reaction is fixed by the metal constituting the components of the framework, in which it may precipitate in the form of hydride.

In the ambience of the reactor, the components of the fuel assemblies of zirconium alloy are covered with a layer of zirconium in accordance with the aforementioned chemical reaction.

The layer of zirconium formed is liable to thicken in consuming the zirconium alloy, in particular in the case of the fuel sheathing tubes. As the oxide formed is a poor heat conductor, the kinetics of the corrosion will increase with the thickness of the oxide, since this kinetic is related to the metal-oxide interface temperature. The thickness of tho metal constituting these sheathing tubes may then become insufficient to ensure that the fuel element is properly maintained position in the reactor.

Furthermore, the hydrogen formed upon oxidation of the zirconium by tile cooling water is given off in contact with the metal of the tube.

In the case of the elements constituting the framework of the assembly, the layer of zirconium formed in the presence of hydrogen on these elements does not permit limiting the diffusion of the hydrogen and therefore the hydridation.

The film of natural oxide (a few nanometers) which covers the elements of hafnium may be deteriorated by the effect of the friction of these elements against one another or against their sheathing tube. It can then no longer afford protection against hydridation by the hydrogen which comes from the primary medium and passes through the stainless steel sheathing tube. This hydridation of the hafnium results in swelling of the metal which may reach 15% in volume and require premature replacement of the affected elements.

Until now, no method was known for effectively protecting the elements constituting the fuel assemblies of water-cooled nuclear reactors, composed of zirconium alloy, or generally, another passifiable alloy or metal such as hafnium and the alloys thereof.

SUMMARY OF THE INVENTION

An object of the invention is therefore to provide a process for the surface oxidation of at least one zone of a part of a passifiable metal or alloy such as zirconium and hafnium, permitting forming on this pact a thin and stable layer of oxide improving the resistance to corrosion of the passifiable metal or alloy.

To this end, a gas enclosing oxygen is activated with an electric plasma or microwave so as to create chemical elements activated in this gas, and the gas activated by the electric discharge is put in contact with the zone of the part to be oxidized, the part being brought to a temperature of 350° to 1050° C. in the zone in which the oxidation is produced.

Preferably, an electric discharge is produced under conditions of current and voltage corresponding to the abnormal luminescent discharge in a gas including oxygen, at a pressure between 1 and 5 torr, so as to create chemical elements activated in this gas, and the gas activated by the electric discharge is put in contact with the zone of the part to be oxidized, the part being at a cathodic potential and at a temperature of 350° to 650° C. in the zone in which the oxidation is produced. The part to be oxidized is placed in an enclosure brought to an anodic potential and enclosing a gas containing oxygen under a pressure of between 1 and 5 torr, and the part to be oxidized is brought to a cathodic potential of 500 to 1000 volts so as to create an abnormal luminescent discharge in the gas in contact with the part and obtain an activated plasma in contact with the surface of the part to be oxidized.

BRIEF DESCRIPTION OF THE DRAWINGS

In order to explain the invention, there will now be described, by way of example, with reference to the accompanying drawings, a manner of carrying out the process according to the invention for achieving the surface oxidation of tubes of great length, such as the guide tubes of a fuel assembly in a pressurized water nuclear reactor, and a manner of carrying out the process according to the invention for achieving the surface oxidation of fuel assembly grids.

EXAMPLE 1

Figure 1:
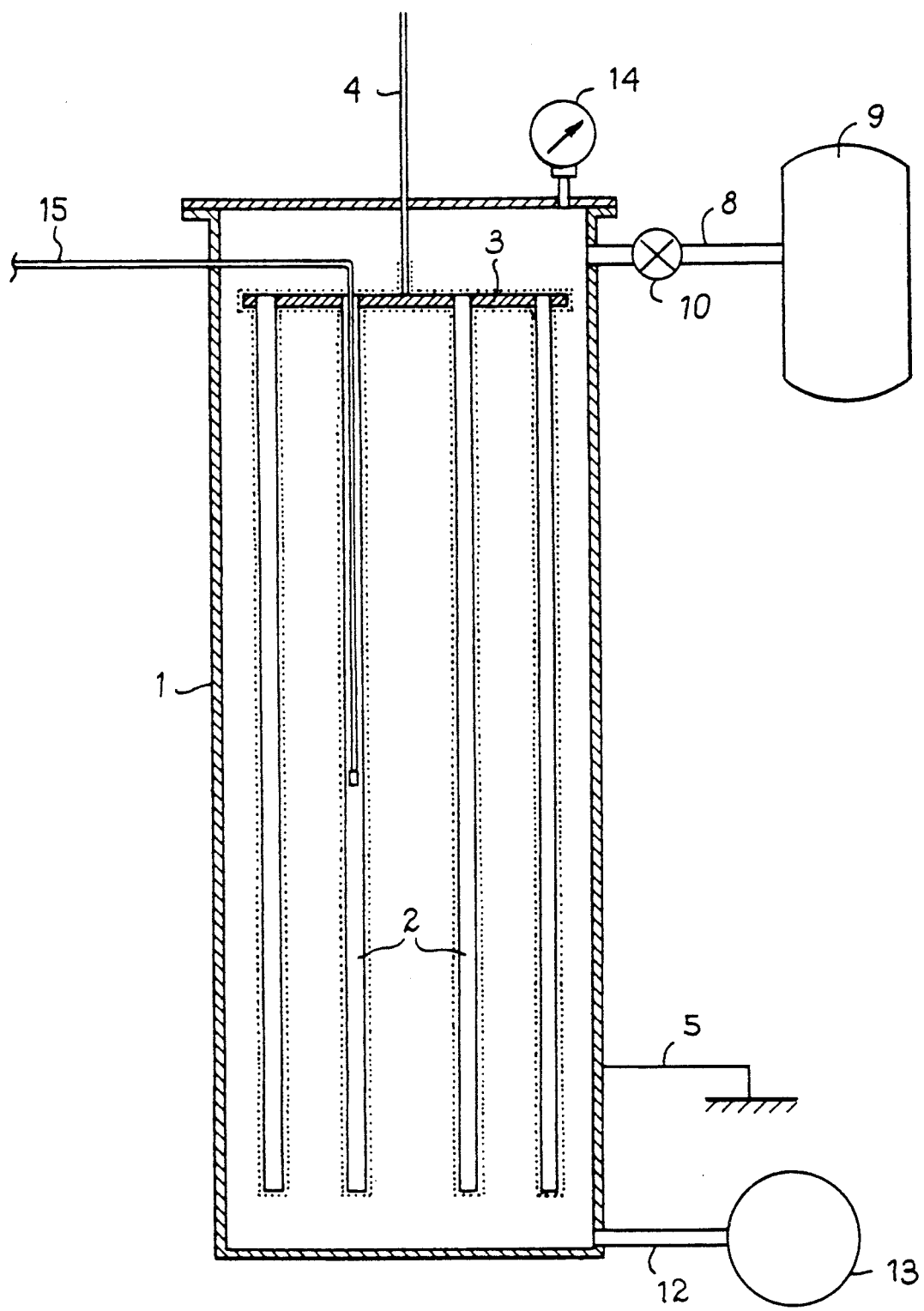
FIG. 1 is a vertical sectional view of an installation for carrying out the surface oxidation of guide tubes of a nuclear reactor.

The installation shown in FIG. 1 comprises an enclosure 1 having a metal wall of the order of 4.50 m, so as to be capable of receiving tubes 2 of Zircaloy 4 having a length exceeding 4 m, such as sheathing tubes of fuel assemblies for a pressurized water nuclear reactor, or such as guide tubes.

The tubas 2 are suspended inside the enclosure by means of a conductive support 3 connected to a terminal of an electric current generator through an electric conductor 4 of large section. The wall of the enclosure 1 is connected to an earthing cable 5.

The inside volume of the enclosure 1 is connected through a pipe 8 to a reservoir or to a distributing circuit 9 for supplying the enclosure 1 with a gaseous mixture including oxygen with a perfectly controlled rate of flow. An isolating valve 10 enables the circuit 9 to be isolated from the enclosure 1. The enclosure 1 is connected, at its end opposed to the end connected to the pipe 8, through a second pipe 12, to a vacuum pump 13 for establishing a primary vacuum in the enclosure 1.

A pressure gauge 14 determines the pressure of the gases in the enclosure 1, and a group of thermocouples, such as 15, determines the temperature in the region of the wall of the tubes on which the ionic oxidation is effected.

The enclosure 1 comprises a cover for introducing the tubes 2 to be oxidized which are fixed to their support in the internal space of the enclosure. The cover is provided with fluidtight closing means.

After closing the enclosure, a primary vacuum is established in the latter by means of the pump 13.

An inert gas such as argon is introduced into the enclosure by the distributing circuit 9. The pressure the argon in the enclosure is maintained at a low value between 1 and 5 torr.

The support 3 and the tubes 2 are brought to a cathodic potential of $-500$ to $-1000$ volts relative to the enclosure.

The surface of the tubes 2 undergo intense ionic bombardment which cleans the outer surface of the tubes 2 and gradually heats the latter.

When the cleaning operation has been completed, the temperature of the tubes is brought to about 300° C.

A mixture of argon and oxygen containing a proportion of 10 to 100% of oxygen by volume is introduced into the enclosure by the circuit 9 and the pipe 10.

Circulation of the gaseous mixture in the enclosure 1 is maintained at a relatively low and constant rate of flow.

The pressure in the enclosure is adjusted to a value of 1 to 5 torr.

Preferably, the total pressure in the enclosure is maintained at a value of 3.3 torr.

The cathodic voltage of the support 3 and tubes 2 and the current are maintained at values which correspond to the conditions of abnormal luminescent discharge in the gas under low pressure surrounding the tubes. The abnormal luminescent discharge corresponds to the zone of the current curve as a function of the electric voltage whose shape is linear and precedes the appearance of arc operation.

This electric discharge operation is perfectly known to those skilled in the art and employed in particular in the hardening treatments of metals by ionic nitriding.

The tubes are at a negative potential of $-500$ to $-1000$ volts relative to the wall of the reactor. The outer surface of the tubes is covered, at a small thickness, by the electric discharge constituted by a plasma in which activated chemical species are formed.

Under the defined conditions, the major part of the voltage drop occurs in a space surrounding the cathode (i.e., the tubes) in a thickness of between a few tenths of a millimeter and a few millimeters. This thickness depends on the pressure and the nature of the gas filling the enclosure and on the nature of the metal constituting the part the ionic oxidation of which is achieved.

The tubes 2 are therefore uniformly surrounded by a plasma enclosing gaseous ions or other activated chemical species which are accelerated by the intense field prevailing in the vicinity of the tubes 2 and in this way produce a bombardment of the outer surface of the tubes.

The tubes are therefore treated in a homogeneous manner throughout their surface throughout the duration of the treatment.

The ionic bombardment supplies power to the tubes 2 on the order of several watts/sq.cm so that the tubes continue to heat up to a temperature corresponding to the thermoelectronic emission.

Under the action of the ionic bombardment, metal ions are ejected from the tubes constituting the cathode. A continuous cleaning of the tubes is therefore produced during the treatment in the presence of argon and oxygen, which improves the compactness of the layer being formed.

Further, gaseous ions are implanted in the surface of the wall of the tubes in a thickness corresponding to a few atomic distances, so that this very thin surface zone of the tube is enriched with oxygen, the oxygen thereafter diffusing within the wall under the effect of the high temperature to which the tube is brought.

There is in this way progressively obtained a layer of oxide whose thickness increases and reaches a value of the order of a micrometer at the end of a few hours.

The layer of oxide obtained is very dense, homogeneous and stable.

It was possible to show, by the diffraction of X-rays, that this layer is principally constituted by zirconium oxide ZrO of monoclinic structure.

An additional heating device for the treatment enclosure (not shown in the FIG. 1) was employed for bringing the temperature of the tubes to a desired value independently of the ionic bombardment.

It was possible to carry out various tests of surface oxidation of tubes of Zircaloy 4 at temperatures varying between 350° and 550° C. during periods ranging up to 25 hours.

The operating conditions and the thickness of the layer of oxide obtained on a tube of Zircaloy 4 are shown in the table below.

TABLE

| Duration in h | Temperature in °C. | Partial pressure of the oxygen (in Pa) | Thickness of the layer of oxide |
|---|---|---|---|
| 5 | 350 | 44 | <1μ |
| 5 | 400 | 44 | <1μ |
| 5 | 450 | 44 | <1μ |
| 5 | 550 | 44 | 4μ |
| 4 | 400 | 110 | 0.3μ |
| 4 | 450 | 110 | 0.5μ |
| 4 | 480 | 110 | 0.7μ |
| 5 | 450 | 100 | |
| 25 | 400 | 44 | 1μ |
| 25 | 450 | 44 | 3μ |
| 25 | 550 | 44 | 6μ |

It is clear that the partial pressure of the oxygen in the gaseous mixture and the duration of the treatment have little effect for the highest temperatures.

A perfectly uniform layer of one or more micrometers in thickness is obtained for temperatures generally between 400° and 550° C.

The layers of oxide formed between 350° C. and 450° C. have an extremely distinct oxide/zirconium alloy substrate interface, while the layers of oxide formed at 550° C. have an extensive interface corresponding to a layer of diffusion of the oxygen.

EXAMPLE 2

The activation of the oxygen species on the upstream side of the oxidation reactor may also be produced by a plasma, microwave or an electric discharge.

Indeed, in the case of oxidation, the active species formed in the plasma have a long life and may be transported to a zone where they interact with a substrate.

This technique, designated by the name "post-discharge", is not possible in the case of nitriding and is of very great utility in the case of surfaces to be oxidized in the vicinity of which it is difficult to produce a plasma by electric discharge.

This is so in the case of the inner surface of the sheathing tubes or guide tubes of fuel assemblies, these tubes having a length in excess of 4 m and an inside diameter of the order of 8 mm and fuel assembly grids whose cells measure 15 mm and less.

The ionic oxidation treatment with "post-discharge" was carried out on the inner and outer surfaces of assembly grids.

Figure 2:
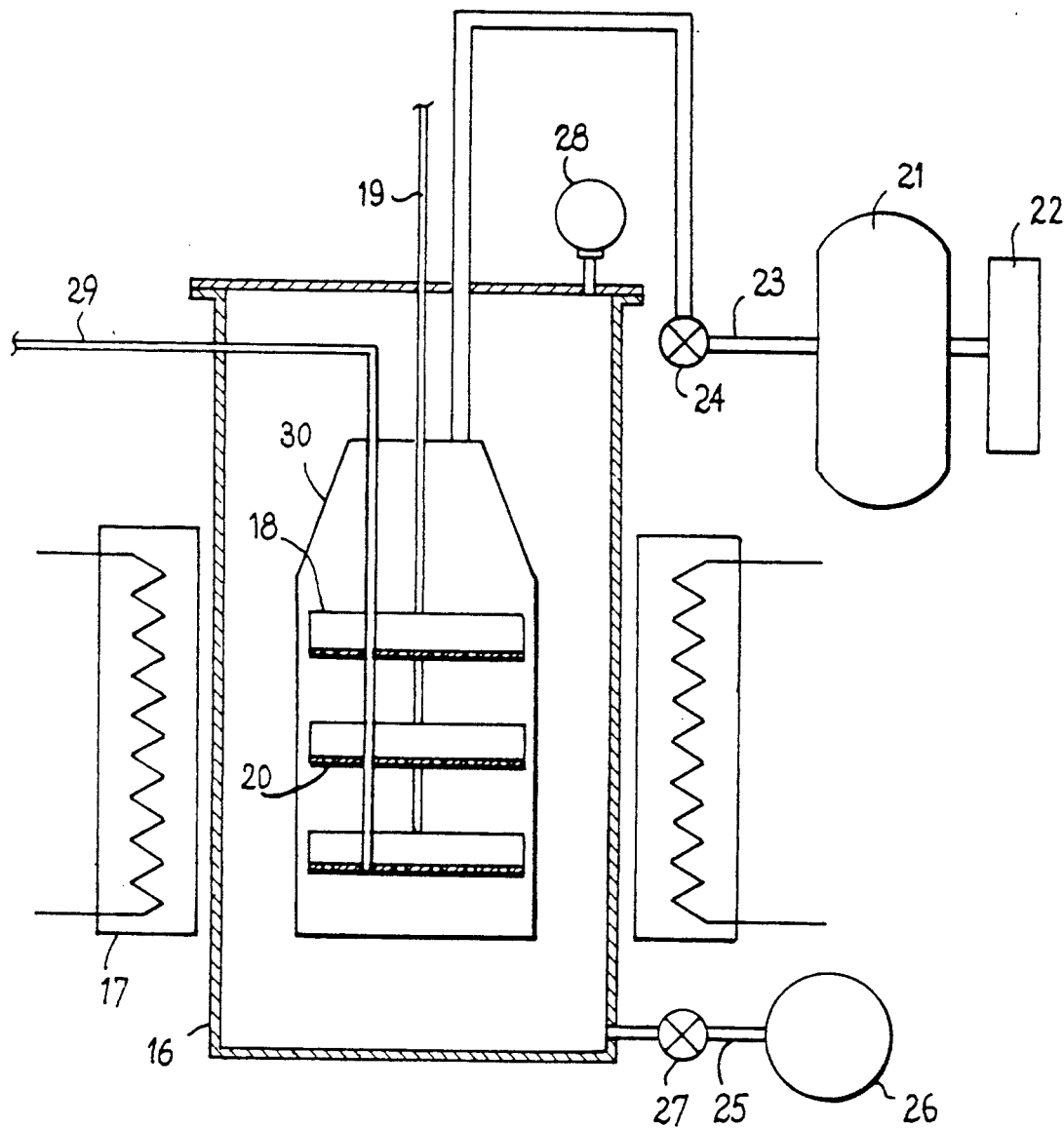
FIG. 2 is a vertical sectional view taken in a vertical plane of an installation for carrying out the surface oxidation of fuel assembly grids.

The installation shown in FIG. 2 comprises an enclosure 16 heated by a furnace 17 of sufficient size to dispose the parts 18 to be treated in a zone where the the tidal gradient is small.

The parts to be treated are placed on a support 19 whose perforated plates 20 allow the gases to pass through.

The activated oxidizing gases are produced by an electric plasma or microwave in an activator 21 supplied through by a circuit 22 supplying argon and oxygen, whereby it is possible to perfectly control the rates of flow of the active species introduced in the reactor through the pipe 23. An isolating valve 24 permits isolating the circuit 9 from the enclosure 16. The gas is guided toward the parts to be treated by screens 30.

At the opposite end of the enclosure, a vacuum pump 26 establishes through a second pipe 25 a primary vacuum in the enclosure. A valve 27 regulates the pressure in the enclosure which is measured by a pressure gauge 28.

Thermocouples 29 measure the temperature within the enclosure.

The enclosure includes a cover provided with fluid-tight closing means.

After closing the enclosure, a primary vacuum established and the parts are brought to the deposition temperature, namely, 350° to 550° C., by means of the furnace 17. With the generator of the activated species in operation, these species (argon + 1 to 10% oxygen) are introduced into the reactor by regulating the pressure by means of the valves 24 and 27 at the chosen working pressure (5 to 500 torr, depending on the shape of the parts to be treated).

Under these conditions, the active oxygen reacts with the surface of the passivatable metals and diffuses under the thermal effect and forms the protective layer of oxide. As soon as this layer becomes substantial, it reduces the affinity between the subjacent metal and the activated oxygen in the gaseous phase so that the oxidation slows down in this region and the activated species become available for reacting further away.

There is consequently progressively obtained a layer of oxide whose thickness reaches a few micrometers after 5 to 25 hours.

The layer of oxide obtained is dense and constituted by monoclinic and quadratic (or cubic) zirconium.

It was possible to carry out various tests of surface oxidation of tubes and strips of Zircaloy 4 at temperatures ranging from 350° to 650° C. during periods ranging up to 100 hours.

The operating conditions and the thickness of the layer of oxide obtained are shown in the following table.

The tubes treated at 600° and 640° C. underwent partial recrystallization.

| Duration in h | Temperature in °C. | Composition of the gas | Thickness of the coating |
|---|---|---|---|
| 2 | 500 | Ar + 3% O$_2$ | 1.2μ |
| 2 | 600 | Ar + 3% O$_2$ | |
| 2 | 640 | Ar + 3% O$_2$ | 3.5μ |
| 100 | 400 | Ar + 1% O$_2$ | 1.5μ |
| 20 | 450 | Ar + 1% O$_2$ | 1.5μ |
| 5 | 500 | Ar + 1% O$_2$ | 1.5μ |

Tests for corrosion were carried out in an autoclave on tubes treated by the ionic oxidation process.

The tests were carried out in an autoclave containing water at 360° C. and at a pressure of 190 bars during a period of one month, and in an autoclave containing steam at 400° C. and 415° C. under a pressure of 103 bars during periods ranging up to 250 days.

In the case of all the tubes tested, the ionic oxidation or "post-discharge" results in a reduction in the corrosion of between 28 and 65%. The corrosion is measured by the increase in the weight of the test specimens subjected to a stay in the autoclave under the aforementioned conditions.

It is possible to employ, instead of an argon/oxygen mixture, other gases containing oxygen, such as pure oxygen or an oxygen/helium mixture.

Treatment temperatures which are different from those mentioned may be employed. These temperatures, in the case of hafnium alloys, are higher than 450° C. and may be as much as about 1000° C. Indeed, as the diffusion of the oxygen in the hafnium is much slower than in the zirconium alloys, very long treatments are required to obtain significant layers of oxide. On the other hand, hafnium only starts to recrystallize near 700° C. (complete recrystallization requires at least 2 hours at 800° C.).

Further, the change from the compact hexagonal structure to centered cubic faces only occurs toward 1750° C. This is why the treatment temperature may be higher than in the case of zirconium and alloys thereof. However, 1050° C. should not be exceeded, especially for alloys containing a few hundred ppm of iron, since there is a risk of the part becoming fragile.

It is possible, in the case of the fabrication of fuel assemblies, to carry out the ionic treatment in the thermal treatment furnace of sheathing tubes or elements constituting the framework of the assembly.

It is also possible to carry out the treatment on fuel assembly frameworks subsequent to their construction.

It is also possible to employ the process according to the invention to achieve the ionic oxidation, with or without "post-discharge", of any element of zirconium alloy employed in a nuclear reactor, such as a pressurized water nuclear reactor.

The treatment according to the invention may be applied to parts of zirconium alloy in any metallurgical or mechanical state.

The process according to the invention may in particular be applied in the case of parts which have been detensioned, recrystallized, surface hardened or hardened to the heart, in the as-cleaned state or parts whose surface has been brushed or polished.

It is also possible to employ the treatment process according to the invention in the case of passivatable alloys, which are different from zirconium alloys and in particular in the case of hafnium, titanium or aluminum alloys employed in the nuclear industry, the chemical industry or any other branch of industry.

The treatment according to the invention may be employed not only for limiting the corrosion of the treated parts but also for reducing the susceptibility to seize or bind and the wear of mechanical parts of passivatable metal.

What is claimed is:

1. Process for surface oxidation of at least one zone of a part composed of a metal or alloy based on a metal of the group consisting of zirconium and hafnium, said process comprising the steps of
    (a) placing said part inside an enclosure and heating said part to a temperature of 350° to 1050° C.;
    (b) activating a gas comprising oxygen with means selected from the group consisting of an electric plasma and a microwave so as to create chemical elements activated in said gas in a zone situated outside said enclosure containing said part;
    (c) introducing said activated gas in said enclosure;
    (d) regulating a pressure of said activated gas in said enclosure at a level between 5 to 500 Torr; and
    (e) maintaining said gas in contact with the heated part for 5 to 25 hours.

2. Process for surface oxidation of at least one zone of a part composed of a metal or alloy based on a metal of the group consisting of zirconium and hafnium, said process comprising the steps of
    (a) placing said part inside an enclosure containing a gas including oxygen at a pressure of 1 to 5 Torr;
    (b) heating said part to a temperature of 350° to 1050° C. in a zone in which oxidation is effected; and
    (c) activating said gas comprising oxygen by bringing said part to an electric potential of $-500$ to $-1000$ volts relative to said enclosure so as to produce an abnormal luminescent discharge in the vicinity of the surface to be oxidized of said part inside said enclosure and oxidation of said part by the effect of chemical species activated by electric discharge in contact with said part.

3. Process according to claim 9, comprising
    (a) placing said part inside an enclosure and heating said part;
    (b) activating said gas comprising oxygen in a zone situated outside said enclosure containing said part;
    (c) introducing said activated gas in said enclosure;
    (d) regulating a pressure of said activated gas in said enclosure at a level between 5 and 500 Torr; and
    (e) maintaining said gas in contact with the heated part for 5 to 25 hours.

4. Process according to claim 1 or 2, wherein said part is of zirconium or zirconium alloy and is heated to a temperature of 350° to 650° C.

5. Process according to claim 12, wherein said part is heated to a temperature of 400° to 550° C.

6. Process according to claim 1 or 2, wherein said part is of alloyed or non-alloyed hafnium and is heated to a temperature of 450° to 1000° C.

* * * * *